(12) United States Patent
Zimmerman et al.

(10) Patent No.: US 12,117,637 B2
(45) Date of Patent: Oct. 15, 2024

(54) DEVICE HOUSING WITH LIGHTING

(71) Applicant: Meso Scale Technologies, LLC., Rockville, MD (US)

(72) Inventors: Cecilia Zimmerman, Clarksburg, MD (US); Jules VanDersarl, Gaithersburg, MD (US)

(73) Assignee: MESO SCALE TECHNOLOGIES, LLC., Rockville, MD (US)

( * ) Notice: Subject to any disclaimer, the term of this patent is extended or adjusted under 35 U.S.C. 154(b) by 0 days.

(21) Appl. No.: 18/370,495

(22) Filed: Sep. 20, 2023

(65) Prior Publication Data
US 2024/0027671 A1  Jan. 25, 2024

Related U.S. Application Data

(63) Continuation of application No. 17/986,182, filed on Nov. 14, 2022, now Pat. No. 11,808,962, which is a
(Continued)

(51) Int. Cl.
*F21V 8/00* (2006.01)
*F21V 3/00* (2015.01)
(Continued)

(52) U.S. Cl.
CPC .............. *G02B 6/0006* (2013.01); *F21V 3/00* (2013.01); *F21Y 2113/10* (2016.08); *F21Y 2115/10* (2016.08); *G08B 5/36* (2013.01)

(58) Field of Classification Search
CPC ......... G02B 6/0006; F21V 3/00; F21V 15/01; F21V 5/02; F21V 14/006; F21Y 2113/10;
(Continued)

(56) References Cited

U.S. PATENT DOCUMENTS

| 4,106,231 A | 8/1978 | MacNiel |
| 5,572,613 A | 11/1996 | Kingsbury |
| (Continued) | | |

FOREIGN PATENT DOCUMENTS

| CN | 104634374 A | 5/2015 |
| CN | 105229372 A | 1/2016 |
| (Continued) | | |

OTHER PUBLICATIONS

Invitation to Pay Additional Fees and Communication Relating to the Results of the Partial International Search dated Mar. 26, 2021 received from the International Searching Authority in International Application No. PCT/US2020/067604.
(Continued)

*Primary Examiner* — Anne M Hines
*Assistant Examiner* — Jose M Diaz
(74) *Attorney, Agent, or Firm* — Scully, Scott, Murphy & Presser, P.C.

(57) ABSTRACT

The application is directed to a device housing. The device housing includes a first light device, the first light device including a first electrical supply configured to provide an electrical signal to a first light emitting diode (LED), the first LED separated from a first surface of a diffuser film by a space, wherein the diffuser film includes a second surface, opposite the first surface, the second surface configured to contact a first light pipe.

21 Claims, 12 Drawing Sheets
(6 of 12 Drawing Sheet(s) Filed in Color)

Related U.S. Application Data continuation of application No. 17/139,000, filed on Dec. 31, 2020, now Pat. No. 11,525,951.

(60) Provisional application No. 62/956,983, filed on Jan. 3, 2020.

(51) Int. Cl.
  *F21Y 113/10* (2016.01)
  *F21Y 115/10* (2016.01)
  *G08B 5/36* (2006.01)

(58) Field of Classification Search
  CPC .... F21Y 2115/10; F21Y 2103/10; G08B 5/36; G08B 5/0252; G08B 5/021; G01N 2201/022; G01N 35/00584
  See application file for complete search history.

(56) References Cited

U.S. PATENT DOCUMENTS

| | | | |
|---|---|---|---|
| 11,525,951 B2 * | 12/2022 | Zimmerman | G02B 6/0006 |
| 2013/0300979 A1 | 11/2013 | Seo et al. | |
| 2014/0340927 A1 | 11/2014 | Johnston et al. | |
| 2019/0301727 A1 | 10/2019 | Sieczkowski | |
| 2020/0140292 A1 | 5/2020 | Schowalter et al. | |
| 2021/0208327 A1 | 7/2021 | Zimmerman et al. | |
| 2023/0070700 A1 | 3/2023 | Zimmerman et al. | |

FOREIGN PATENT DOCUMENTS

| | | |
|---|---|---|
| CN | 106996535 A | 8/2017 |
| JP | 2014126579 A | 7/2014 |
| JP | 2016128944 A | 7/2016 |
| WO | 2016/092678 A1 | 6/2016 |

OTHER PUBLICATIONS

International Search Report and Written Opinion dated May 18, 2021 received in International Application No. PCT/US2020/067604.
Canadian Examination Report dated Nov. 28, 2023 received in Canadian Application No. 3,166,431.
International Preliminary Report on Patentability dated Jul. 5, 2022 received in International Application No. PCT/US2020/067604.
Chinese Office Action dated Aug. 24, 2023 received in Chinese Application No. 202080091262.7, together with an English-language translation.
English-language translation the Japanese Office Action dated Apr. 15, 2024, received in a corresponding foreign application, namely Japanese Patent Application No. 2022-540884, 10 pages.
English-language translation the Chinese Office Action dated Apr. 3, 2024, received in a corresponding foreign application, namely Chinese Patent Application No. 202080091262.7, 17 pages.

* cited by examiner

DEVICE HOUSING WITH LIGHTING

CROSS-REFERENCE TO RELATED APPLICATIONS

The present application is a continuation of co-pending application having U.S. Ser. No. 17/986,182, filed on Nov. 14, 2022, which is a continuation of co-pending application having U.S. Ser. No. 17/139,000, filed on Dec. 31, 2020, now U.S. Pat. No. 11,525,951, which claims the benefit of U.S. Provisional Application No. 62/956,983 filed on Jan. 3, 2020, the entire contents of which are incorporated herein by reference.

BACKGROUND OF THE DISCLOSURE

Methods and devices have been developed for lighting support structures such as housings for apparatuses including those for conducting chemical, biochemical, and/or biological assays, housings for consumer products such as computers, kitchen appliances, and electronics, structures for automotive interiors and exteriors, and structures for architectural details. These methods and devices are used in a variety of applications including medical diagnostics, food and beverage testing, environmental monitoring, manufacturing quality control, drug discovery, basic scientific research, automotive, cooking, and interior design. These uses may be for utilitarian and aesthetic purposes. For example, utilitarian reasons include showing the status of an apparatus contained in the housing (e.g., via color or intermittent flashing or pulsing), or lighting a display on the housing for visualization by a user.

A variety of apparatuses are available for conducting assay measurements including instruments that measure changes in optical absorbance, emission of luminescence (e.g., fluorescence, phosphorescence, chemiluminescence, and electrochemiluminescence (ECL)), emission of radiation, changes in light scattering, and changes in a magnetic field. U.S. Patent Application Publications 2004/0022677 and 2005/0052646 (which are both incorporated by reference) describe solutions that are useful for carrying out singleplex and multiplex ECL assays in a multi-well plate format. They include plates that comprise a plate top with through-holes that form the walls of the wells and a plate bottom that is sealed against the plate top to form the bottom of the wells. The plate bottom has patterned conductive layers that provide the wells with electrode surfaces that act as both solid phase supports for binding reactions as well as electrodes for inducing ECL. The conductive layers may also include electrical contacts for applying electrical energy to the electrode surfaces. Reference is also made to U.S. application Ser. No. 11/642,968, the contents of which are incorporated by reference.

Challenges arise for developing methods and devices for lighting support structures, e.g., housings, when the surface of the support structure contains a shape such as an angle, curve (convex or concave), or indentation.

Thus, improved methods and devices for lighting are needed for aesthetic and utilitarian reasons. Some improvements resulting from the disclosed methods and devices result in a more even distribution of light across a surface of a housing due to the structure of the light devices disclosed below. The disclosed light devices are engineered to have a compact, low-profile design, be easily manufactured, and not require Fresnel lenses.

SUMMARY OF THE DISCLOSURE

The present disclosure is directed to a light device, a housing comprising a light device, and methods of making such devices and housings. In embodiments, the housing encloses one or more instruments.

In the present disclosure, a device housing can include a first light device, the first light device comprising a first electrical supply configured to provide an electrical signal to a first light emitting diode (LED), the first LED separated from a first surface of a diffuser film by a space, wherein the diffuser film comprises a second surface, opposite the first surface, the second surface configured to contact a first light pipe.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will be better understood by reference to the following drawings, which are provided as illustrative of certain embodiments of the subject application, and not meant to limit the scope of the present disclosure.

DETAILED DESCRIPTION OF THE DISCLOSURE

Figure 1:
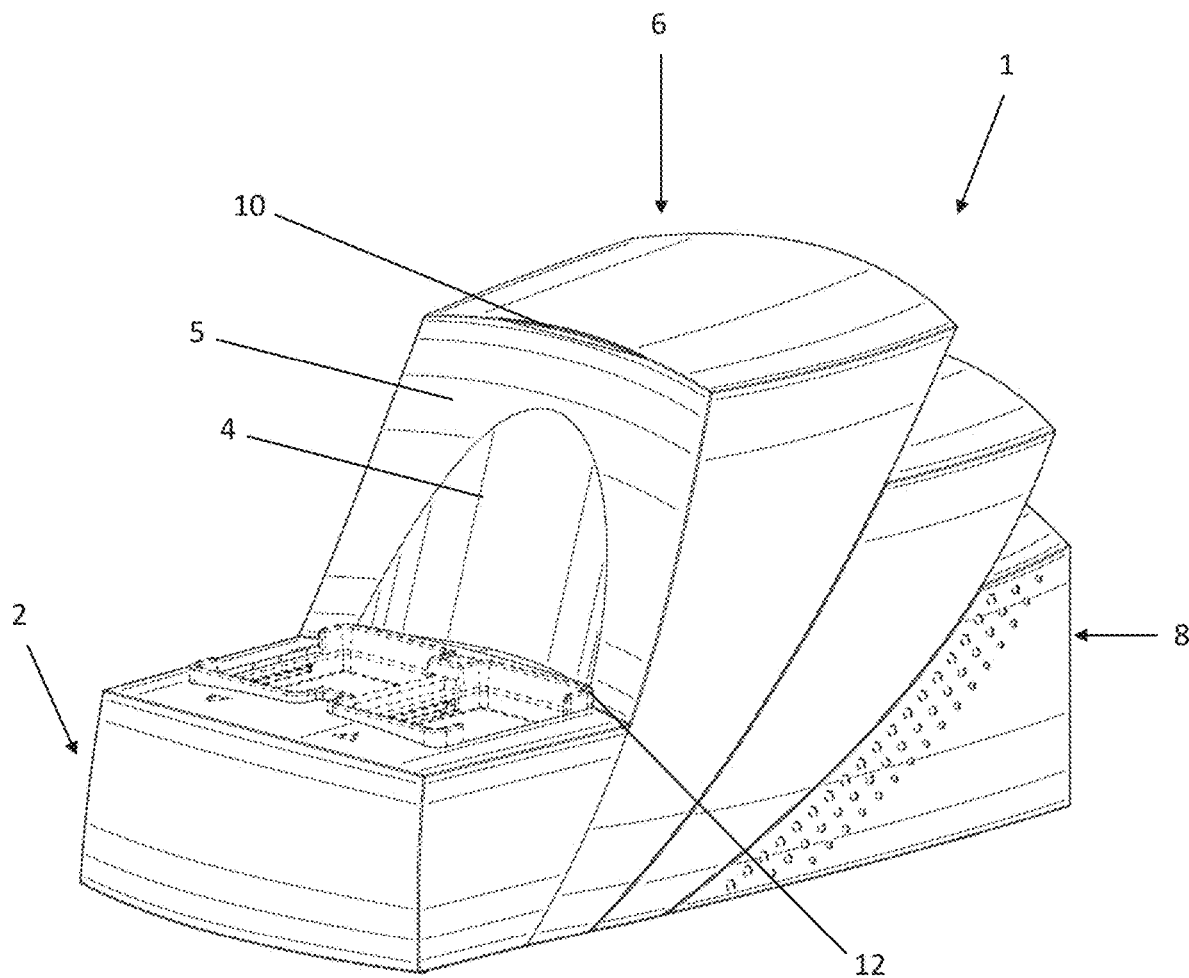
FIG. 1 is a graphical illustration of a perspective view of a device housing.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat.

As used herein terms such as "a", "an" and "the" are not intended to refer to only a singular entity, but include the general class of which a specific example may be used for illustration.

As used herein, terms defined in the singular are intended to include those terms defined in the plural and vice versa.

References in the specification to "one embodiment", "certain embodiments", some embodiments" or "an embodiment", indicate that the embodiment(s) described may include a particular feature or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. For purposes of the description hereinafter, the terms "upper", "lower", "right", "left", "vertical", "horizontal", "top", "bottom", and derivatives thereof shall relate to the invention, as it is oriented in the drawing figures. The terms "overlying", "atop", "positioned on" or "positioned atop" means that a first element, is present on a second element, wherein intervening elements interface between the first element and the second element. The term "direct contact" or "attached to" means that a first element, and a second element are connected without any intermediary element at the interface of the two elements.

Reference herein to any numerical range expressly includes each numerical value (including fractional numbers and whole numbers) encompassed by that range. To illustrate, reference herein to a range of "at least 50" or "at least about 50" includes whole numbers of 51, 52, 53, 54, 55, 56, 57, 58, 59, 60, etc., and fractional numbers 50.1, 50.2 50.3, 50.4, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

FIG. 1 is an illustration of a device housing 1. The device housing 1 is an example of a structure that is capable of containing one, two, or more light devices described in the present disclosure. In other embodiments, the one or more light devices described in the present disclosure can be included in any other suitable housing and/or support structure.

The device housing 1 includes a front 2, a front light face 4, a front light face border 5, a top 6, and a right side 8. Also included are a left side and bottom of the device housing, although these features are not illustrated. Also included in the device housing 1 is an upper light device 10 and a lower light device 12, each of which will be discussed in more detail below. In other embodiments, the device housing 1 can include either the upper light device or the lower light device 12, and in other embodiments the size and location of these light devices can be different. Either or both of the upper light device 10 and the lower light device 12 can display various colors and/or intensities of light, which can act as status identifiers. For example, a first steady-state color (e.g., blue or green) indicates that the instrument in the housing is turned on but idle, a second steady-state color (e.g., red or yellow) indicates that the instrument in the housing is either not ready or requires attention (e.g., a fault state), and a pulsing color (e.g., blue or green) indicates that the instrument is turned on and operating or operational.

In this example of device housing 1, front light face 4 is shown as a substantially curved, flat structure, but in other embodiments, front light face 4 can be formed of different flat shapes, or, can be other angular and/or curved shapes.

Although not shown, device housing 1 can include various electrical and internet connections, either, wired or wireless, to provide electricity and information/communication ability to the device housing 1.

As seen in FIG. 1, the device housing 1 can include several surfaces, each of which can be formed of the same, or different material. The material is any suitable material selected from metals, plastic based materials, rubbers, carbon based materials, glasses, and combinations thereof.

Each surface of the device housing 1 can include a layer of paint, and/or an adhesive element (such as a sticker and/or an adhesive wrap), and/or no extra material on the outer surface of the material that forms that portion of the device housing 1.

Each surface of the device housing 1 can be finished in any suitable way, such as with a matte finish, a shiny finish, and levels of light reflectance in between.

Figure 2:
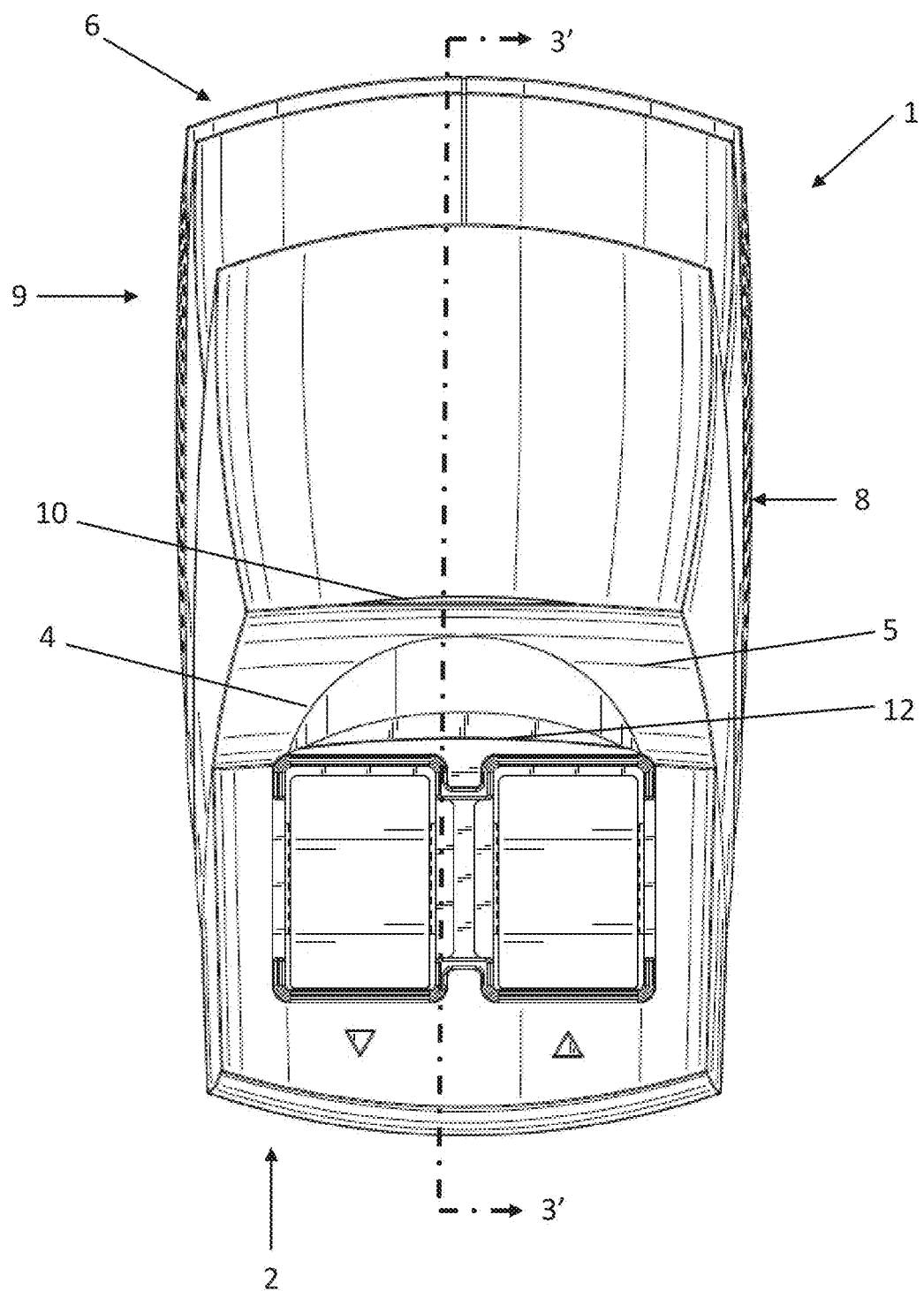
FIG. 2 is a graphical illustration of a top view of the device housing.

FIG. 2 is a top view of device housing 1, which illustrates the components mentioned above in another perspective, such that left side 9 is partially visible. As can be seen in FIG. 2, the upper light device 10 spans a substantially linear distance along the front 2 of the device housing 1. Also, the lower light device 12 spans a substantially linear distance, which is vertically offset from upper light device 10, along the front 2 of the device housing 1. The upper light device 10 can be included at or near the transition between the front 2 and the top 6. The lower light device 12 can be included at or near the transition between the front 2 and the front light face 4. In other embodiments, the upper light device 10 can be separate from, and not contact the device housing 1. In other embodiments, the lower light device 12 can be separate from, and not contact the device housing 1.

Figure 3:
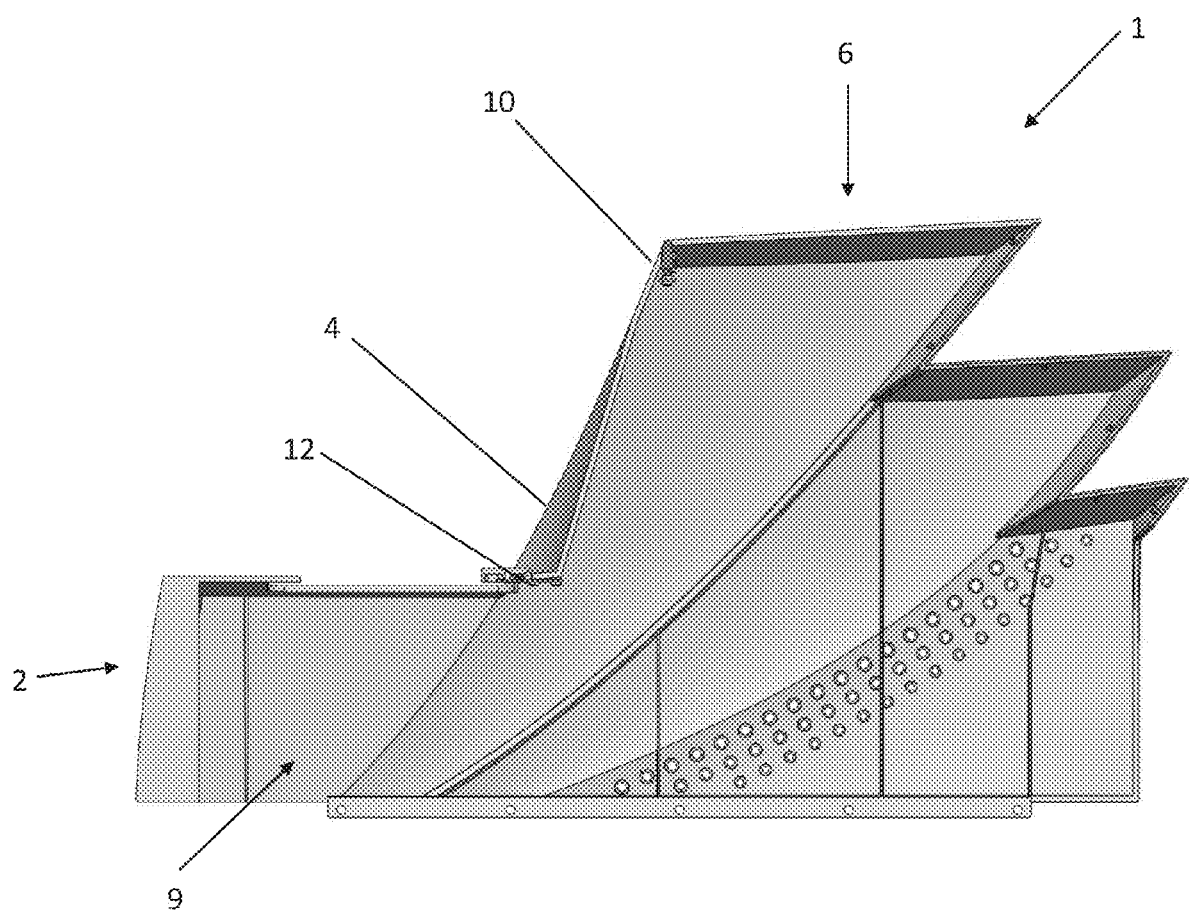
FIG. 3 is a graphical illustration of a cross-sectional view of the device housing.

A cross section of the device housing 1, along line 3' (shown in FIG. 2) is shown in FIG. 3. The interior of device housing 1 is shown as hollow in this figure, to aid in explanation, with an interior surface of left side 9 visible. However, the interior of device housing 1 can include any suitable electrical apparatus and any suitable analytical apparatus.

Although FIG. 3 illustrates some more details regarding upper light device 10 and lower light device 12, further detail is provided in the subsequent images, which offer magnified views of these components.

Figure 4A:
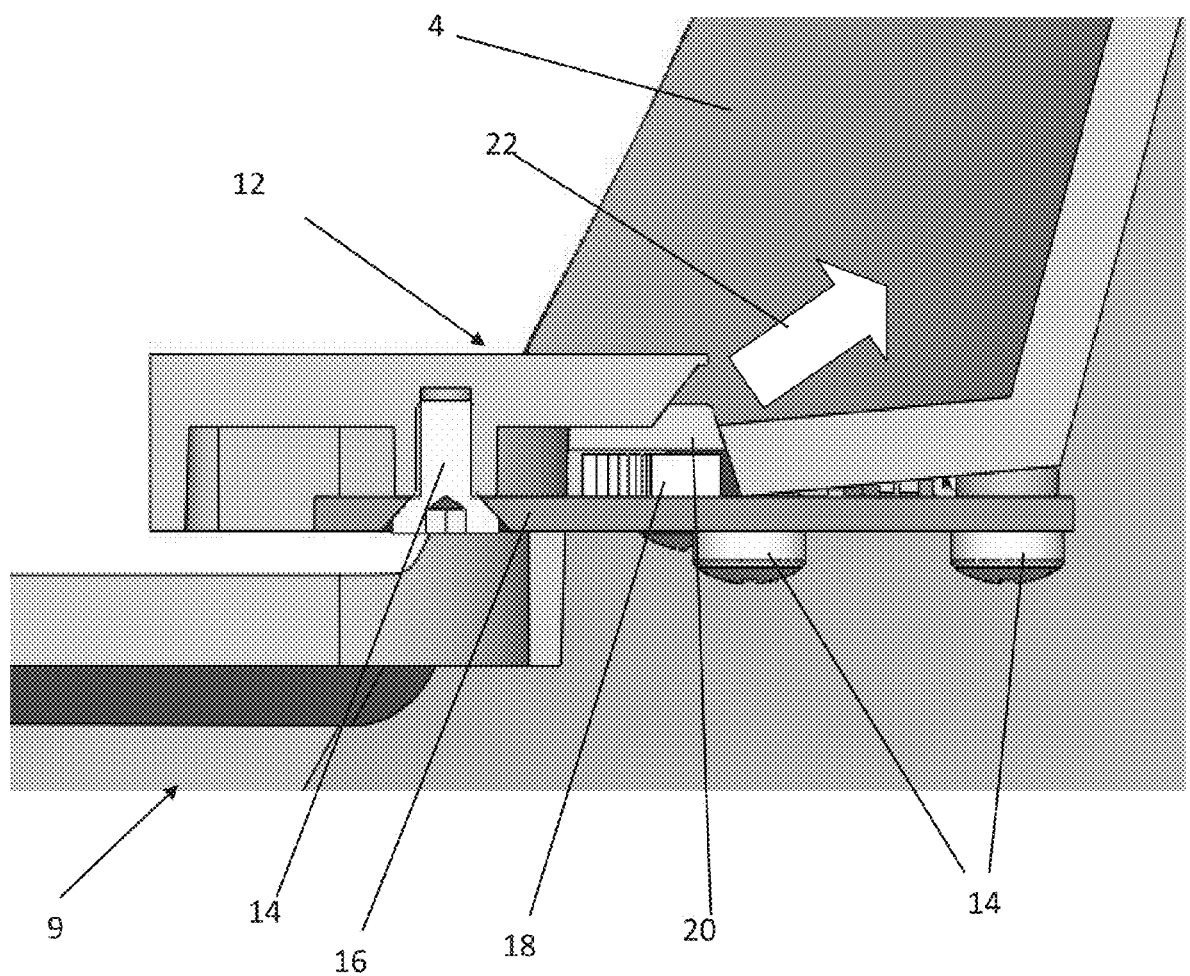
FIG. 4A-4C are views of the lower light device.

A magnified view of a cross section (from FIG. 3) of the lower light device 12 is shown in FIG. 4A. The lower light device 12 is connected to the device housing by one or more mounting elements 14. In this embodiment the mounting elements 14 are shown as screws, but in other embodiments, the mounting elements 14 can be any suitable mechanism that is capable of maintaining the lower light device 12's position within the device housing, such as a clip, snap, nail, staple and/or adhesive.

The lower light device 12 includes a printed circuit board (electrical supply) 16, which supports one or more light emitting diodes (LEDs) 18. The printed circuit board 16 can be any suitable structure that can physically support the one or more LEDs 18, and also provide electricity to each of the one or more LEDs 18. The printed circuit board 16 can be formed of any suitable material.

A divergence angle of the LEDs 18, as well as other LEDs disclosed in the present application, is about 120°, but, can be any angle between about 90° and about 180°. Further, LEDs 18, as well as other LEDs disclosed in the present application, are capable of producing various colors (including but not limited to white, blue, green, red, and yellow), various brightnesses of light and various warmth values of light.

Only one full LED 18 is shown in FIG. 4A, however, LEDs 18 can extend along any portion, or the entire, length of the lower light device 12. The spacing between adjacent LEDs 18 can be any suitable size for the desired application.

To guide light generated from the one or more LEDs 18, a light pipe 20 is located between the one or more LEDs 18 and the front light face 4. For example, the spacing between adjacent LEDs 18 can be such that overlapping regions of illumination are formed by the one or more LEDs 18 in the direction of arrow 22, toward the front light face 4.

As one non-limiting example of forming overlapping regions of illumination, about thirty LEDs 18 can be included in upper light device 10, each of which can be spaced apart about 0.16" from center to center (about 0.05" separation between each individual LED). In other embodiments of forming overlapping regions of illumination, each of the LEDs 18 can be spaced apart from about 0.02" to about 0.10" from each other. As one of ordinary skill can determine, for housings smaller or larger than device housing 1, a fewer or more LEDs than thirty may be used.

The term "light pipe" refers to any optical device or combination of devices having a collecting surface (for example, 42 of light pipe 20, 58 of light pipe 30 (discussed below)) through which light may be received into the light pipe device itself, a guide (for example, light pipe 20, light pipe 30) through which received light is directed from the collecting surface to an outlet (for example, 44 of light pipe 20, 54 and/or 56 of light pipe 30), and the outlet through which all or most of the received light is emitted. Those of skill in the art can substitute or use any suitable device or structure that is capable of receiving light through any collecting surface, and capable of guiding the received light through the device or structure to an outlet.

In one embodiment, the light pipe generally comprises an elongated transparent or translucent member having a collecting surface, a guide portion with reflection surfaces and an emission outlet. When a light ray is directed at the collecting surface portion of the light pipe, the light is received in the guide and reflected along a trajectory toward an outlet adjacent to or abutting an optical sensor. The light pipe facilitates total internal reflection of the light and hence passes most or all of the light to the emission outlet.

In this disclosure, the light pipe 20 can be formed of one or more suitable materials, such as plastics, glasses, and combinations thereof.

In FIG. 4A, light is accepted into light pipe 20 through a face of the light pipe 20 that contacts (or nearly contacts) the one or more LEDs 18. Light is emitted from light pipe 20 in the direction of arrow 22, towards the front light face 4. The light emitted from the light pipe 20 towards the front light face can be relatively uniform, due to the spacing between adjacent LEDs 18, and the structure of the light pipe 20, so that overlapping regions of illumination are formed toward the front light face 4. This relatively uniform light can be achieved without the inclusion of one or more Fresnel lenses.

The light pipe 20 can be of a shape shown in FIG. 4A, which directs light generated by the one or more LEDs 18 more generally towards the entire surface of the front light face 4. A vertically thicker light pipe 20 in this structure would typically direct more light from the one or more LEDs 18 towards the vertical bottom portion of the front light face 4, with the individual locations of each of the one or more LEDs 18 more noticeable due to this direction of light.

The height (thickness) of the light pipe 20 can be any suitable thickness, such as, for example between about 0.05" to about 0.15", about 0.07" to about 0.143", about 0.08" to about 0.125", about 0.085" to about 0.115", or about 0.1". Also, the light pipe 20 can be formed of any suitable material, such as a polycarbonate material that can be at least partially clear, and may have either a smooth, or a textured finish on any of the surfaces of light pipe 20.

Figure 4B:
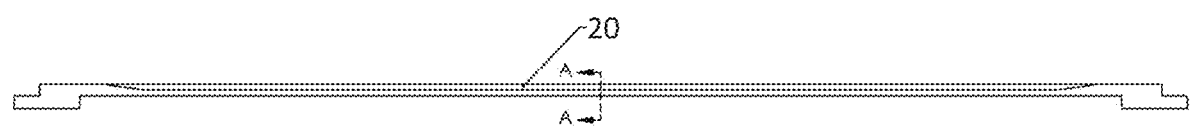

A more detailed view of the light pipe 20 is shown in FIG. 4B. FIG. 4B is a front view of the light pipe 20, with FIG. 4C being a cross sectional view of light pipe 20 along line A-A of FIG. 4B.

Figure 4C:
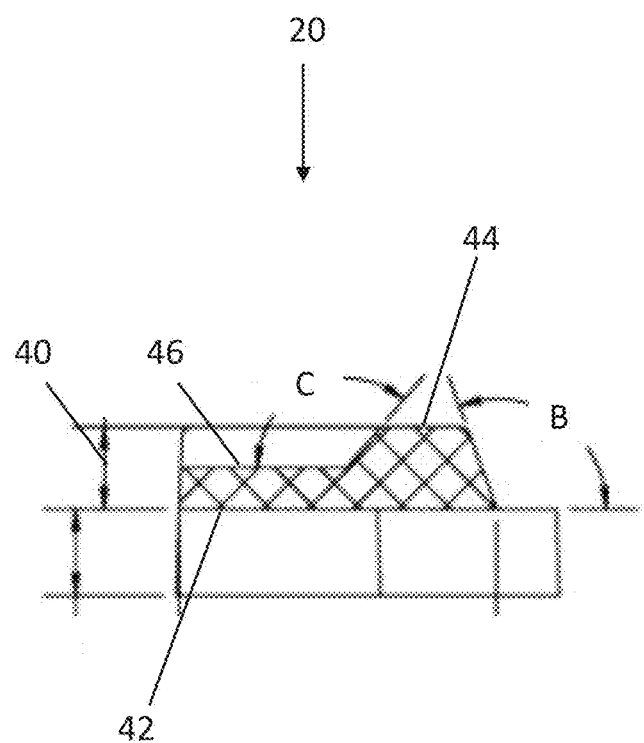

In FIG. 4C, a height 40 of the light pipe 20 is about 0.08", but as mentioned above, in other embodiments, this distance can be smaller or larger. This height 40 extends between a lower surface 42 to a first upper surface 44. Angle B between the lower surface 42 to the first upper surface 44 is about 110°, however, in other embodiments, this angle can be 10%, 20% or more larger or smaller than about 110°. Angle C between a second upper surface 46 and the first upper surface 44 is about 130°, however, in other embodiments, this angle can be 10%, 20% or more larger or smaller than about 130°.

In the embodiment shown in FIG. 4C, the ratio of the height of the second upper surface 46 to the height 40 is about 50%, however, in other embodiments, this ratio can be 10%, 20% or more larger or smaller than about 50%.

In other embodiments, the height of the second upper surface 46 can be larger than the height 40, so that second upper surface 46 is further from the lower surface 42 than the first upper surface 44. In this embodiment an angle between the second upper surface 46 and the first upper surface 44 would be about 50° however, in other embodiments, this angle can be 10%, 20% or more larger or smaller than about 50°.

Also as can be seen in FIG. 4C, the sum of Angles B and C is about 180° between the lower surface 42 and the second upper surface 46, however, in other embodiments, this angle can be 10%, 20% or more larger or smaller than about 180°, and, in yet other embodiments, these angles be a portion of a circumference of a circle.

Figure 5A:
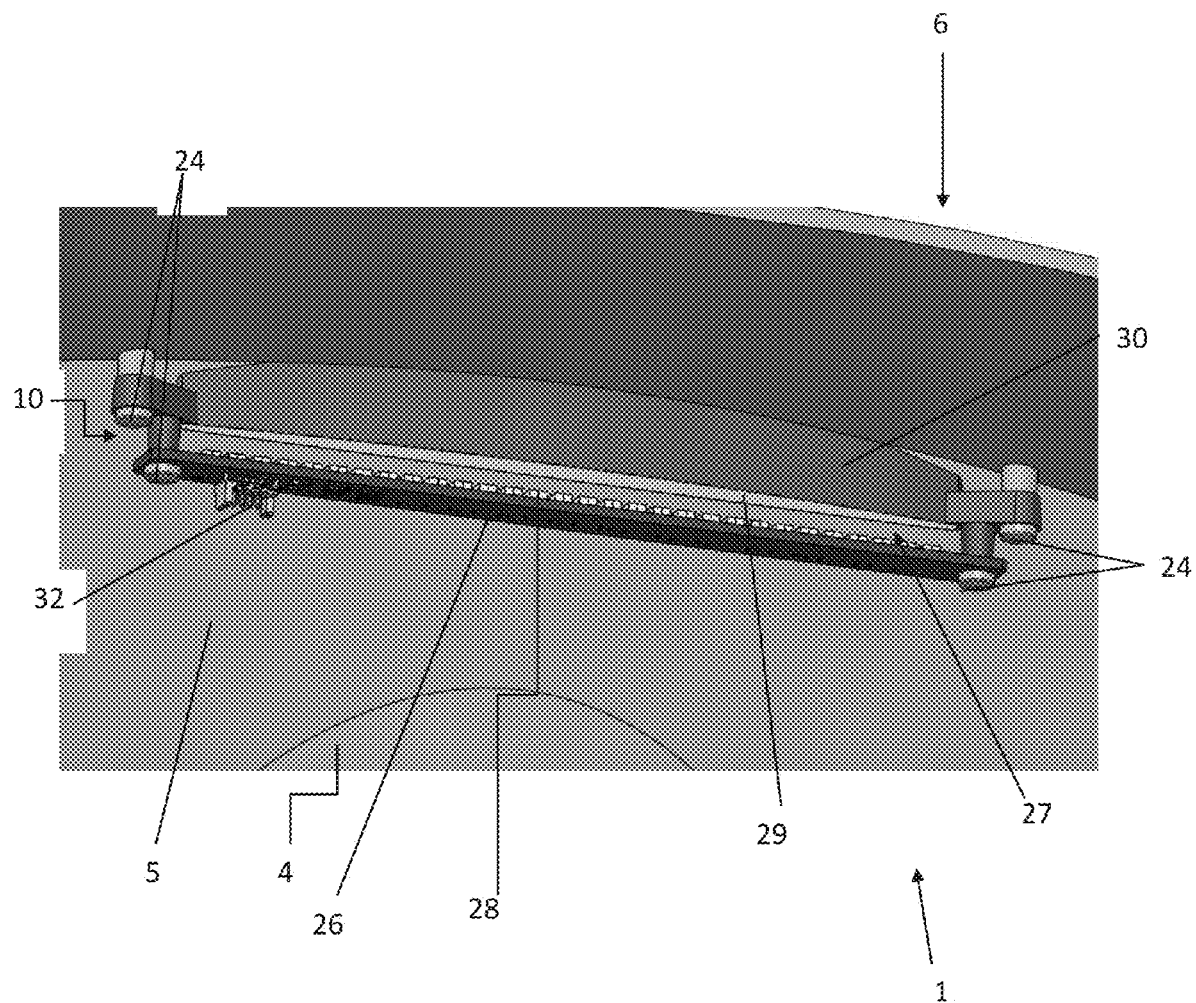
FIGS. 5A-5D are views of the upper light device.
Figure 5B:
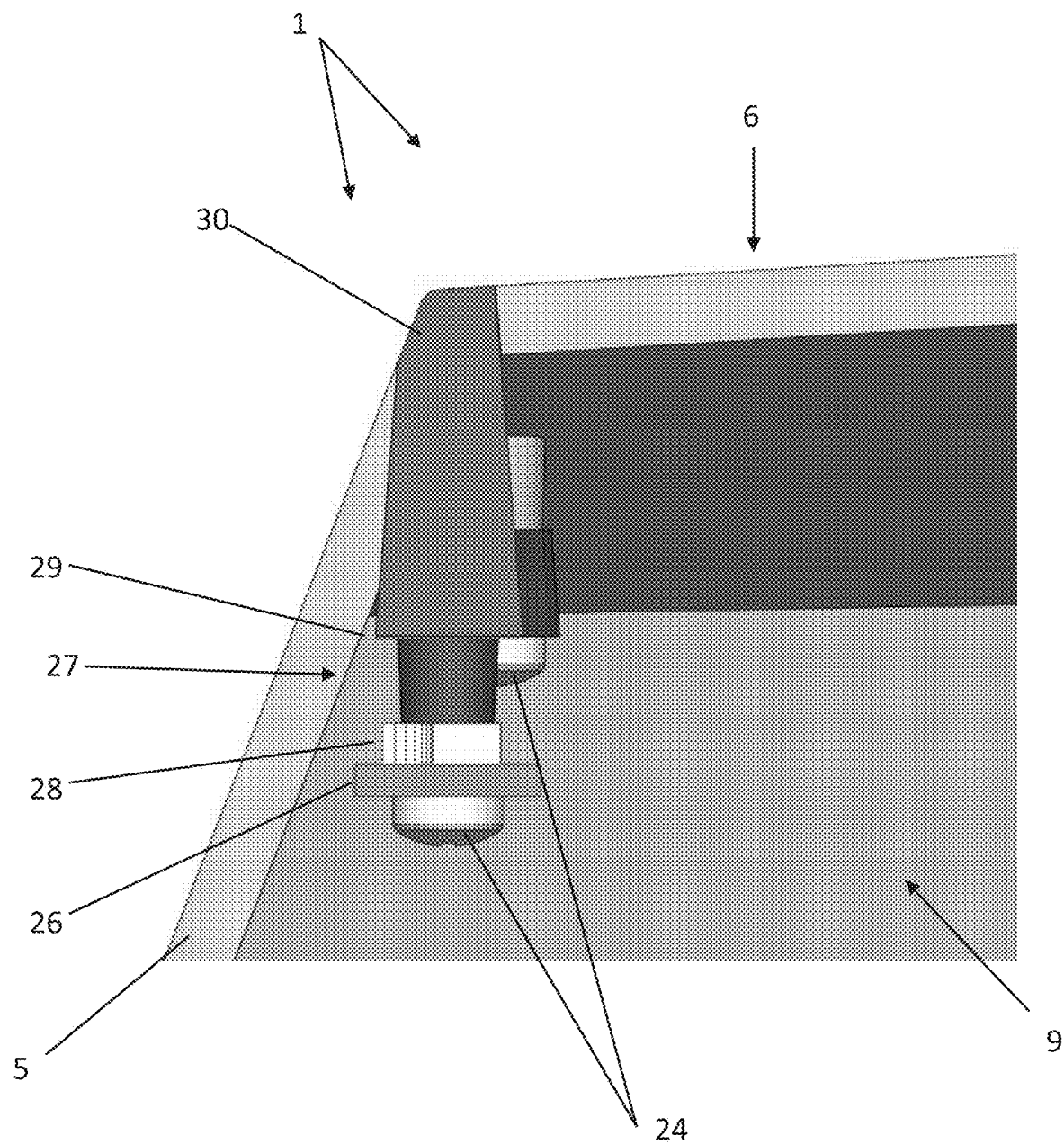

A magnified view of a perspective view of the upper light device 10 (from FIG. 3) is shown in FIG. 5A, a cross section (from FIG. 3) of the upper light device 10 is shown in FIG. 5B.

FIG. 5A is a perspective view of the upper light device 10, the perspective being from the rear of the device housing 1 towards the interface between the top 6 and the front light face border 5. The upper light device 10 is connected to the device housing by one or more mounting elements 24. In this embodiment the mounting elements 24 are shown as screws, but in other embodiments, the mounting elements 24 can be any suitable mechanism that is capable of maintaining the upper light device 10's position within the device housing, such as a clip, snap, nail, staple and/or adhesive.

The upper light device 10 includes a printed circuit board (electrical supply) 26, which supports one or more light emitting diodes (LEDs) 28. The printed circuit board 26 can be any suitable structure that can physically support the one or more LEDs 28, and also provide electricity to each of the one or more LEDs 28. The printed circuit board 26 can be formed of any suitable material.

Several LEDs 28 are shown in FIG. 5A, however, LEDs 28 can extend along any portion, or the entire, length of the upper light device 10. The spacing between adjacent LEDs 28 can be any suitable size for the desired application. For example, the spacing between adjacent LEDs 28 can be such that overlapping regions of illumination are formed by the one or more LEDs 28. As one non-limiting example of forming overlapping regions of illumination, about twenty four LEDs 28 can be included in lower light device 12, each of which can be spaced apart about 0.30" from center to center (about 0.19" between each individual LED). In other embodiments of forming overlapping regions of illumination, each of the LEDs 28 can be spaced apart from about 0.1" to about 0.40" from each other. As one of ordinary skill can determine, for housings smaller or larger than device housing 1, fewer or more LEDs than twenty four may be used.

Vertically between the one or more LEDs 28 and a diffuser film 29 is a space 27. This space 27 can be any suitable size, or not present at all. The space 27 can be between about 0.05" to about 0.15", about 0.07" to about 0.143", about 0.08" to about 0.125", about 0.085" to about 0.115", or about 0.090". In other embodiments, the space 27 can be configured to be a distance that is large enough to allow the light from the LEDs 28 to partially scatter/spread before reaching the light pipe 30, but a distance that is small enough that the majority of the light from the LEDs 28 pass through the light pipe 30.

The diffuser film 29 receives the light from the one or more LEDs 28, transmits the light, and contacts a light pipe 30. As used herein the term, "diffuser film" means any material, of any suitable thickness, that is able to scatter specular light (light with a primary direction) at many angles to produce a diffuse light (light with random light direction). The diffuser film 29 can be made of any suitable material, such as from one or more polymers, glass or paper. The diffuser film 29 can be transparent or translucent. In other embodiments, the diffuser film 29 can be an engineered diffuser with patterns embossed onto the surface of the film. In other embodiments, the diffuser film 29 can be a holographic diffuser fabricated by recording laser speckle patterns onto a photoresist or film. In other embodiments, the diffuser film 29 can be a diffractive diffuser or a material with particulate additives for scattering light.

Some non-limiting examples of a diffuser film 29 are: 3M™ Envision™ Diffuser Film 3735-50; DFPM grade circular diffuser film supplied by Grafix plastics; and EDF-L1 Engineered diffuser film supplied by RPC Photonics, Inc.

An electrical connector 32 is also illustrated in FIG. 5A, which can be configured to connect to any suitable incoming electrical signal, which will be delivered to the one or more LEDs 28.

As can be seen in FIG. 5B, the light pipe 30 forms a portion of the exterior surface of the device housing 1, forming a portion of an edge between the front light face border 5 and the top 6.

Figure 5C:
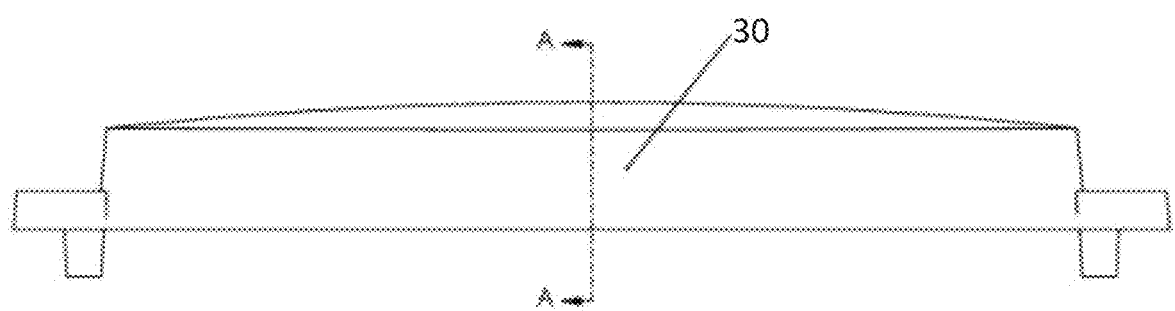

A more detailed view of the light pipe 30 is shown in FIG. 5C. FIG. 5C is a front view of the light pipe 30, with FIG. 5D being a cross sectional view of light pipe 30 along line A-A of FIG. 5C. The light pipe 30 can be formed of any suitable material, such as a polycarbonate material that can be at least partially clear, and may have either a smooth, or a textured finish on any of the surfaces of light pipe 30. The light emitted from the light pipe can be relatively uniform, due to the spacing between adjacent LEDs 28, and the structure of the light pipe 30, so that overlapping regions of illumination are formed in a direction away from the light pipe 30. This relatively uniform light can be achieved without the inclusion of one or more Fresnel lenses.

Figure 5D:
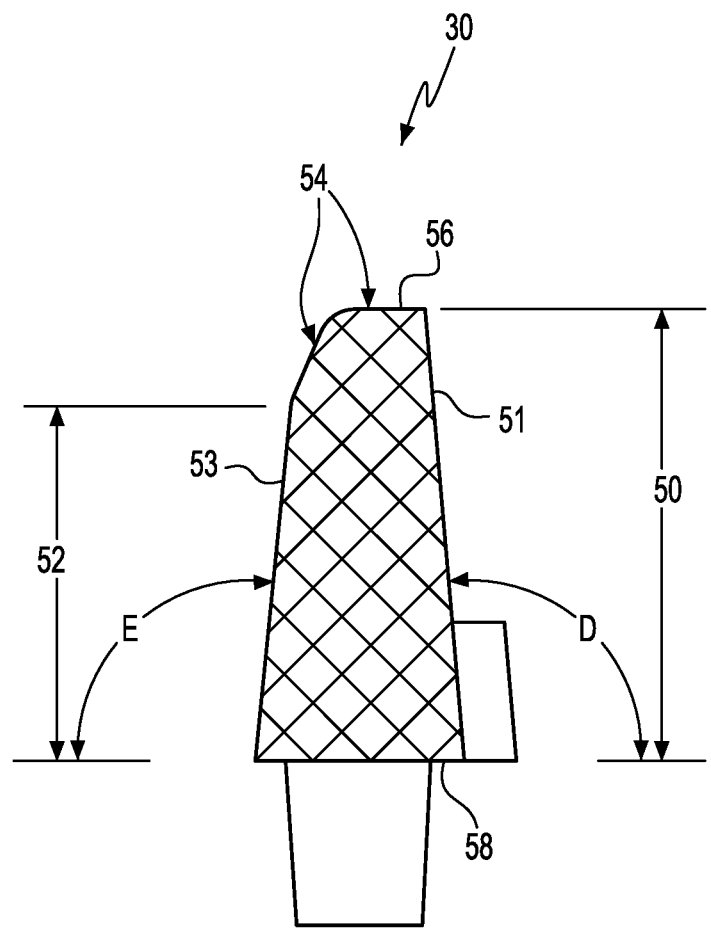

In FIG. 5D, a first height 50 of the light pipe 30 is about 0.65", a second height 52 is about 0.52", however, the first height 50 and the second height 52 can be 10%, 20% or more larger or smaller than each of these dimensions. The first height 50 extends from a top surface 56 to a bottom surface 58 along a first height surface 51. The second height 52 extends from the bottom surface 58 to the bottom of portions 54 along a second height surface 53.

The difference in height between the first height 50 and the second height 52 is variable based on the portions 54 of the light pipe 30. The portions 54 can be angled and/or curved, and in some embodiments, form a surface of a device housing or device. In other embodiments, the second height 52 can be the same or substantially the same as the first height 50. In yet other embodiments, the second height 52 can be larger than the first height 50.

Angle D between the lower surface 58, and the first height surface 51 is about 95°, however, in other embodiments, this angle can be 10%, 20% or more greater or less than about 95°. Angle E between the lower surface 58 and the second height surface 53 is about 95°, however, in other embodiments, this angle can be 10%, 20% or more greater or less than about 95°.

The location of upper light device 10 and lower light device 12 have been described above in reference to the device shown in FIGS. 1-3, the location of upper light device 10 and lower light device 12 can be other locations in or on device housing 1.

Also, although device housing 1 has been described above in reference to the housing shown in FIGS. 1-3, in other embodiments, one or both of upper light device 10 and lower light device 12 can be included in and/or on various other pieces of equipment or apparatuses, described above such as a computer (e.g., a laptop computer), kitchen appliance, or consumer electronic equipment to provide utilitarian or aesthetic illumination as described above.

In other embodiments, one or both of upper light device 10 and lower light device 12 can be included in and/or on a mobile device such as a smart phone.

Another aspect of the disclosure is a method of manufacturing the upper light device 10, the lower light device 12, the device housing 1, and modifications and variations thereof as described.

Another aspect of the disclosure is a method of lighting a surface of a device housing 1. In this aspect the upper light device 10 and/or the lower light device 12 can be arranged in any suitable location and orientation with respect to a surface of the device housing 1, for example a front light face 4. The upper light device 10 and/or the lower light device 12 can be supplied with an electrical signal such that the LEDs 28 of the upper light device 10 and/or the LEDs 18 of lower light device 12 are illuminated. The upper light device 10 alone can be supplied with an electrical signal, the lower light device 12 alone can be supplied with an electrical signal, or both the upper light device 10 and the lower light device 12 can be supplied, simultaneously or alternately, with an electrical signal.

As discussed above, the spacing of LEDs 28 of the upper light device 10 and the spacing of LEDs 18 of lower light device 12 can be configured so that the distance between each of the LEDs forms overlapping regions of illumination on a surface of the device housing 1.

The LEDs 28 of the upper light device 10 and the LEDs 18 of lower light device 12 can be supplied with an electrical signal continuously, for a period of time, so that the LEDs 28 of the upper light device 10 and the LEDs 18 of lower light device 12 continuously illuminate at a first color. For example, a continuous illumination of green or blue can indicate that a device within the device housing 1 is powered, but idle.

Further, the LEDs 28 of the upper light device 10 and the LEDs 18 of lower light device 12 can be supplied with an electrical signal continuously, for a period of time, so that the LEDs 28 of the upper light device 10 and the LEDs 18 of lower light device 12 continuously illuminate at a second color, different from the first color. For example, a continuous illumination of red or yellow can indicate that a device within the device housing 1 is in a fault state due, for example, to the device not being ready to conduct the activity, or that attention is required from a user.

The LEDs 28 of the upper light device 10 and the LEDs 18 of lower light device 12 can be supplied with an electrical signal in a pulsed sequence over a length of time so that the LEDs 28 of the upper light device 10 and the LEDs 18 of lower light device 12 are supplied for a period of time to illuminate the LEDs 28 of the upper light device 10 and the LEDs 18 of lower light device 12 at a first color (different or the same as the first color that is continuously illuminated) followed by not being supplied for a period of time. This gives the effect of the LEDs 28 of the upper light device 10 and the LEDs 18 of lower light device 12 appearing to blink on and off over the length of time. For example, this alternate illumination can be of green or blue and can indicate that a device within the device housing 1 is operating or operational.

Alternatively, instead of displaying different colors for different states, the intensity of light illuminated from the LEDs 28 of the upper light device 10 and the LEDs 18 of lower light device 12 can be increased or decreased.

In an aspect of the disclosure, the device housing 1 comprises an AC to DC converter. The converter is configured to convert a power source, such as a wall power supply into a DC link voltage. For example, a wall power supply may be 120 VAC @ 60 Hz. The wall power supply may be 240 VAC or another AC voltage. The voltage of the DC link may be defined as needed. For example, the DC link voltage may be based on the number of LEDs used and its configuration. For example, in an aspect of the disclosure, the LEDs 18 or 28 may be serially connected. Thus, the DC link voltage is a sum of the voltage required to operate each LED.

In other aspects of the disclosure, instead of using an external power supply, such as a wall power supply, the device housing 1 may comprise an internal power supply such as a battery. The battery will provide DC voltage. In accordance with this aspect of the disclosure, the device housing 1 may also include a DC to DC converter. Where multiple LEDs 18 or 28 are connected in series, the DC to DC converter may be a boost converter, which increases the voltage from the battery voltage provided.

The device housing 1 may further comprise a pulse width modulation (PWM) circuit that controls the duty cycle of the supplied voltage to the LEDs 18 or 28. The PWM circuit controls the intensity of the light emitted by the LEDs. In one aspect of the disclosure, the PWM circuit may be implemented as a 555 timer PWM.

In an aspect of the disclosure, the PWM circuit may be connected with a dimmer switch to change the intensity of the LEDs. For example, the dimmer switch may be a potentiometer (POT). The POT may be disposed anywhere in or on the device housing 1, or, the POT can be disposed outside the device housing 1.

Figure 6A:
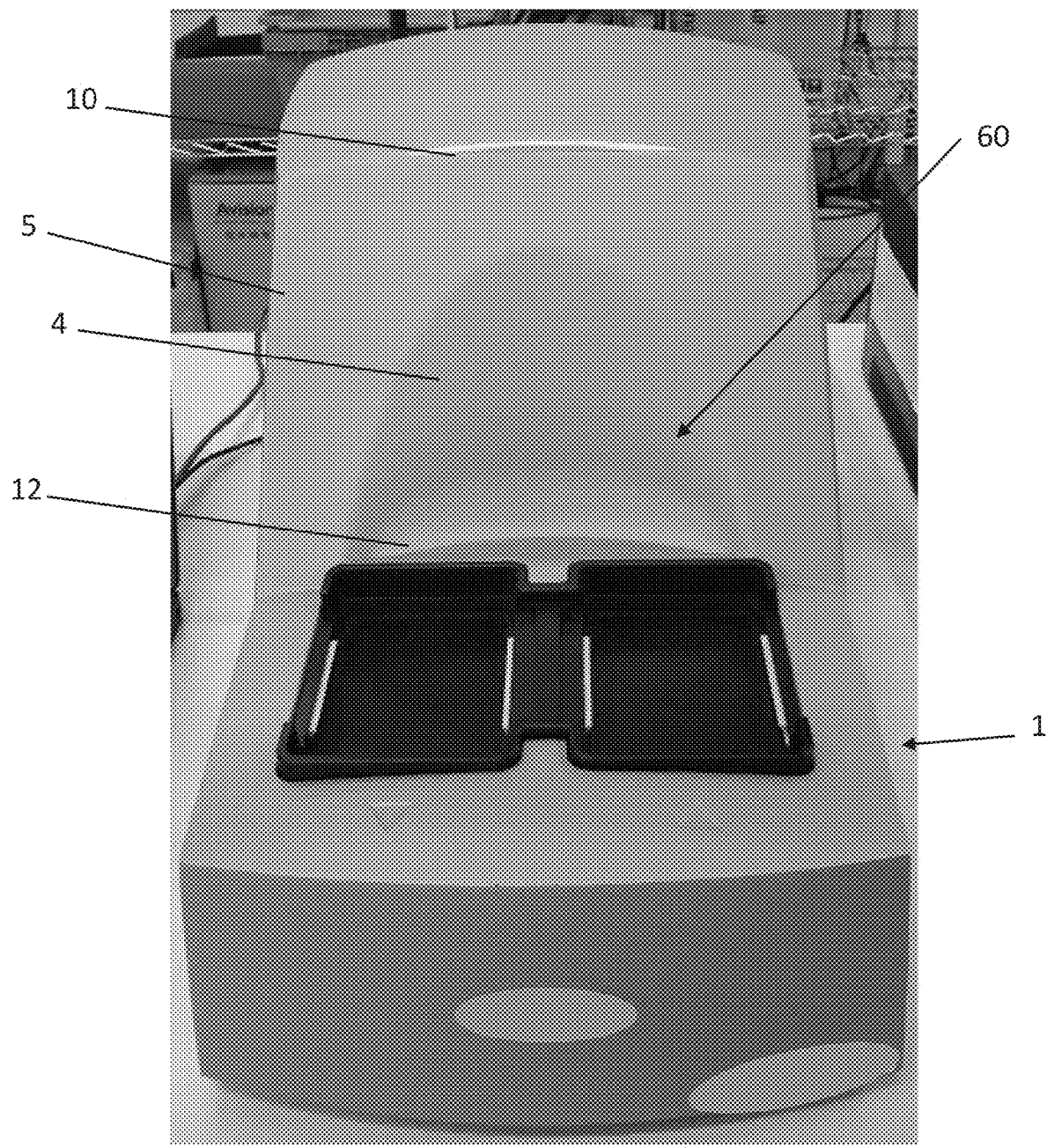
FIG. 6A is a photograph of one example of a device housing.

One embodiment of device housing 1 is shown in FIG. 6A. The device housing 1 includes the front 2, the front light face 4, and the front light face border 5. In FIG. 6A, the upper light device 10 spans a substantially linear distance along the front 2 of the device housing 1. Also, the lower light device 12 spans a substantially linear distance along the front 2 of the device housing 1.

As can be seen in FIG. 6A, the lower light device 12 is illuminated, and is forming an area of illumination 60 on the front light face 4. This area of illumination 60 is formed due to the illumination of LEDs 18 (shown in FIG. 4A) illuminating overlapping regions of illumination on the surface of the front light face 4. As can be seen in FIG. 6A, and in FIG. 6B discussed below, the area of illumination 60 is relatively uniform from a left side of the front light face 4 to a right side of the front light face 4.

Figure 6B:
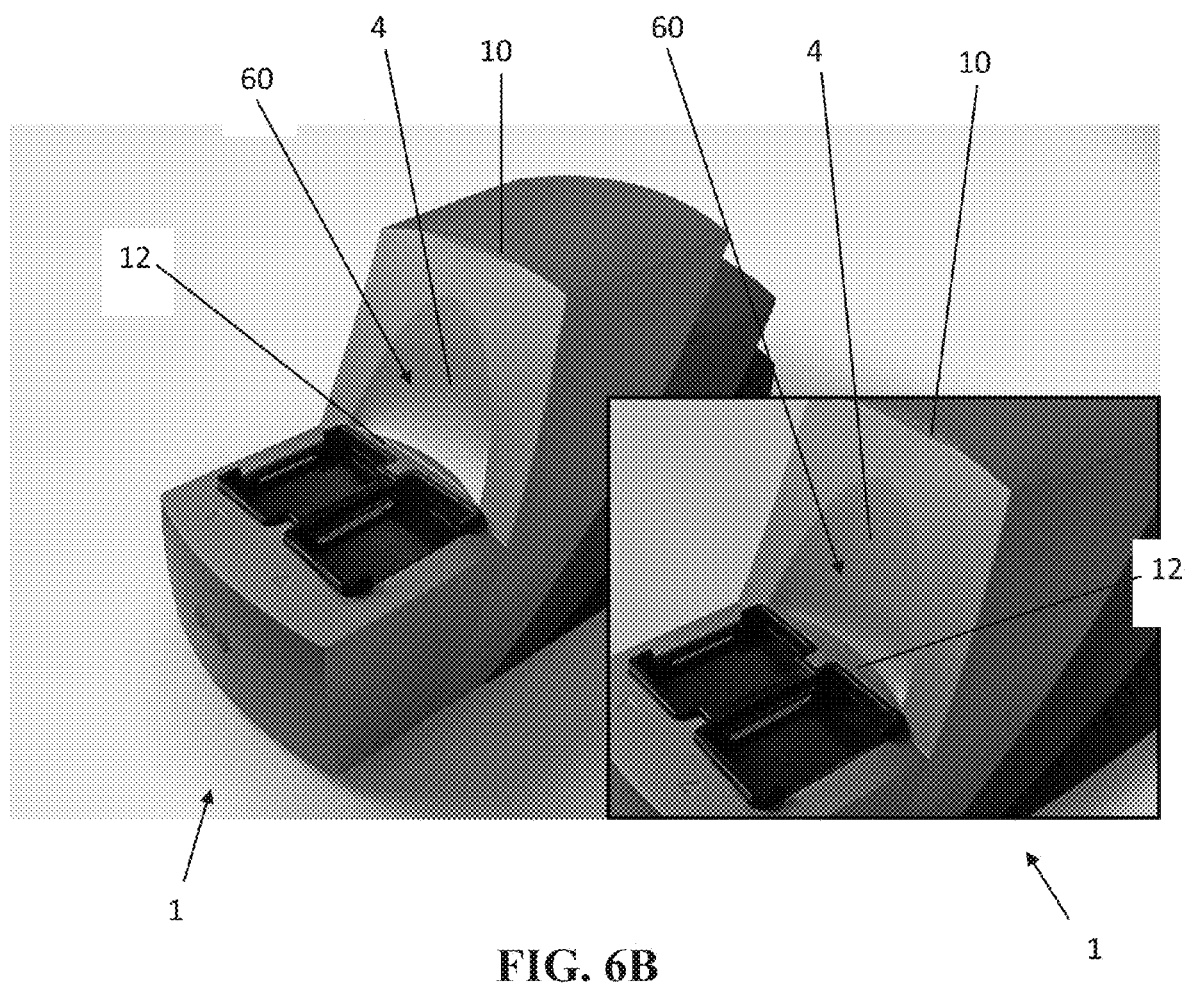
FIG. 6B is a rendering of two examples of device housings.

Another embodiment of device housing 1 is shown in FIG. 6B, with two different statuses identified.

In the device housing 1 to the left, the area of illumination 60 on the front light face, as a result of illumination by the lower light device 12, and the upper light device 10, are both illuminated in a first steady-state color of blue. In this example, this color blue indicates that the instrument in the device housing 1 is turned on, but idle.

In the device housing 1 to the right (shown as an inset), the area of illumination 60 on the front light face, as a result of illumination by the lower light device 12, and the upper light device 10, are both illuminated in a first steady-state color of red. In this example, this color red indicates that the instrument in the device housing 1 is in a fault state due, for example, to the device not being ready to conduct the activity, or that attention is required from a user.

In an aspect of the disclosure, the same PWM circuit may be used to control both sets of LEDs 18/28. In other aspect of the disclosure, two separate PWM circuits are independently used to control the respective sets of LEDs 18 or 28. One PWM circuit is installed in the printed circuit board 16 and another PWM circuit is installed in the printed circuit board 26. Similarly, separate and independent DC to DC converters (or AC to DC converters) would be installed in the respective printed circuit boards.

In an aspects of the disclosure, a current limiting resistor R is placed in series with the LEDs. The current limiting resistor R has a resistance configured to keep the current at a specified level. Where the LEDs 18 are in parallel, a current limiting resistor R will be placed in series with each LED 18.

The upper light device 10 and lower light device 12 are described herein as being included in a specific device housing, however, in other embodiments one or both of the upper light device 10 and lower light device 12 can be included in any other suitable housing, device, or surface.

The described embodiments and examples of the present disclosure are intended to be illustrative rather than restrictive, and are not intended to represent every embodiment or example of the present disclosure. While the fundamental novel features of the disclosure as applied to various specific embodiments thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Further, various modifications and variations can be made without departing from the spirit or scope of the disclosure as set forth in the following claims both literally and in equivalents recognized in law.

The invention claimed is:

1. A device housing comprising:
a top and a bottom, the top having an edge;
a front light face comprising an area of illumination;
a front light face border at least partially surrounding the front light face and extending from the edge to a lower light device distal from the edge, the lower light device comprising a first LED element in contact with a first light pipe element and configured to direct light from the first LED element to the area of illumination.

2. The device housing of claim 1 wherein the first LED element comprises a plurality of LEDs, and the first light pipe element comprises a plurality of first light pipes, each of the LEDs in contact with a respective first light pipe.

3. The device housing of claim 1 wherein the light is selected from various colors.

4. The device housing of claim 3 wherein each color relates to an operational status.

5. The device of claim 1 further comprising an upper light device, the upper light device comprising a second LED element separated from a first surface of a diffuser film by a space, the diffuser film comprising a second surface opposite the first surface, the second surface in contact with a second light pipe element, the second light pipe element forming a part of the edge.

6. The device of claim 5 wherein the second LED element comprises a plurality of second LEDs.

7. A device housing comprising:
a first light device, the first light device comprising an electrical supply configured to provide an electrical signal to a first plurality of light emitting diodes (LEDs), the first plurality of LEDs separated from a first surface of a diffuser film by a space, the first surface of the diffuser film extending over the plurality of LEDs, wherein the diffuser film comprises a second surface, opposite the first surface, the second surface configured to contact a first light pipe.

8. The device housing of claim 7 wherein the first plurality of LEDs form overlapping regions of illumination.

9. The device housing of claim 7 wherein a surface of the first light device forms a portion of a surface of the device housing.

10. The device housing of claim 9 wherein the surface is an edge.

11. The device housing of claim 7 wherein the space is configured to be a distance sufficient to allow the light from the plurality of LEDs to partially scatter and spread while allowing the majority of the light from the LEDs to pass through the first light pipe.

12. An assay measurement instrument within the device housing of claim 11 wherein the plurality of LEDs indicate operational status of the instrument when illuminated.

13. The assay measurement instrument of claim 12 wherein different operational statuses are indicated when the plurality of LEDs are illuminated.

14. The assay measurement instrument of claim 12 wherein the assay measurement instrument measures changes in electrochemiluminescence (ECL).

15. The assay measurement instrument of claim 13 wherein the different operational statuses are indicated by different colors when the plurality LEDs are illuminated.

16. The assay measurement instrument of claim 15 wherein the different operational statuses include idle status, fault status, or that the instrument is operating or operational.

17. An assay measurement instrument within the device housing of claim 7 wherein the plurality of LEDs indicate operational status of the instrument when illuminated.

18. The assay measurement instrument of claim 17 wherein different operational statuses are indicated when the LEDs are illuminated.

19. The assay measurement instrument of claim 17 wherein the assay measurement instrument measures changes in electrochemiluminedcence (ECL).

20. The assay measurement instrument of claim 18 wherein the different operational statuses are indicated by different colors when the LEDs are illuminated.

21. The assay measurement instrument of claim 20 wherein the different operational statuses include idle status, fault status, or that the instrument is operating or operational.

* * * * *